(12) United States Patent
Smith et al.

(10) Patent No.: US 11,899,224 B2
(45) Date of Patent: Feb. 13, 2024

(54) SYSTEMS AND METHODS FOR A LENSED DISPLAY

(71) Applicant: Universal City Studios LLC, Universal City, CA (US)

(72) Inventors: John David Smith, Orlando, FL (US); Bradford Ross Benn, Orlando, FL (US); Peter Carsillo, Orlando, FL (US); Tony Plett, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/114,433

(22) Filed: Feb. 27, 2023

(65) Prior Publication Data

US 2023/0221576 A1 Jul. 13, 2023

Related U.S. Application Data

(63) Continuation of application No. 17/179,146, filed on Feb. 18, 2021, now Pat. No. 11,614,636.

(Continued)

(51) Int. Cl.
*G03B 21/62* (2014.01)
*G02B 30/56* (2020.01)
(Continued)

(52) U.S. Cl.
CPC .......... *G02B 30/40* (2020.01); *H04N 9/3152* (2013.01); *H04N 13/302* (2018.05); *H04N 13/388* (2018.05)

(58) Field of Classification Search
CPC ........ G03B 21/56; G03B 21/62; G02B 30/56; G02B 30/40; H04N 13/302; H04N 13/30; H04N 13/388
See application file for complete search history.

(56) References Cited

U.S. PATENT DOCUMENTS 3,868,173 A    2/1975  Miles et al.
11,614,636 B2* 3/2023  Smith ................... G03B 21/62
                                              353/28

(Continued)

FOREIGN PATENT DOCUMENTS

JP    2006184404 A    7/2006
JP       6397655 B2   9/2018

OTHER PUBLICATIONS

Kawakami et al. "360-degree screen-free floating 3D image in a crystal ball using a spatially imaged iris and rotational multiview DFD Technologies," Aug. 1, 2017, vol. 56, No. 22, Optical Society of America, pp. 6156-6167.

(Continued)

*Primary Examiner* — Ryan D Howard
(74) *Attorney, Agent, or Firm* — Fletcher Yoder, P.C.

(57) ABSTRACT

A lensed display system includes a projector configured to project an image. The lensed display system includes a lens formed of a glass or crystalline material. The lens includes a first surface, wherein at least a portion of the first surface includes a coating that is configured to display the projected image. The lens includes a second surface, wherein the second surface comprises a transparent curved surface that is configured to face toward a user and to enable the user to view the image projected onto the coating through the transparent curved surface.

20 Claims, 3 Drawing Sheets

Related U.S. Application Data

(60) Provisional application No. 62/979,754, filed on Feb. 21, 2020.

(51) Int. Cl.
*G02B 30/40* (2020.01)
*H04N 13/302* (2018.01)
*H04N 13/388* (2018.01)
*H04N 9/31* (2006.01)

(56) References Cited

U.S. PATENT DOCUMENTS

| | | |
|---|---|---|
| 2005/0017924 A1 | 1/2005 | Utt et al. |
| 2010/0173561 A1 | 7/2010 | Tseng |
| 2015/0288914 A1 | 10/2015 | Minneman et al. |
| 2019/0212569 A1 | 7/2019 | Ohyama |

OTHER PUBLICATIONS

Simon Bond, "Crystal Ball Photography: What It Is and How You Can Do It Too," DOI: https://expertphotography.com/crystal-ball-photography-what-it-is-and-how-you-can-do-it-too/, pp. 1-13, Last accessed Dec. 17, 2019.

International Search Report and Written Opinion for PCT Application No. PCT/US2021/018688, dated May 27, 2021, 37 pages.

\* cited by examiner

SYSTEMS AND METHODS FOR A LENSED DISPLAY

CROSS-REFERENCE TO RELATED APPLICATIONS

This application is a continuation of U.S. Non-Provisional patent application Ser. No. 17/179,146, entitled "SYSTEMS AND METHODS FOR LENSED DISPLAY," filed Feb. 18, 2021, which claims priority from and the benefit of U.S. Provisional Application Ser. No. 62/979,754, entitled "SYSTEMS AND METHODS FOR LENSED DISPLAY," filed Feb. 21, 2020, both of which are hereby incorporated by reference in their entirety for all purposes.

BACKGROUND

The present disclosure relates generally to displays for amusement park attractions and experiences.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often contain attractions or experiences that use video and/or still images to provide enjoyment and entertain guests of the amusement parks. For example, the attractions may include themed environments established using display devices displaying media content (e.g., in the form of video, text, still image, motion graphics, or a combination thereof). For some attractions, it may be desirable to display media content with special visual effects to create a realistic and/or immersive viewing or playing experience for an audience. In one example, such special visual effects may be achieved using holography technology, where the media content is displayed using a hologram produced by illuminating a holographic medium that encodes a light field emanating from a scene as an interference pattern. When the holographic medium is suitably lit with a light source, the interference pattern diffracts the light into a three-dimensional (3D) hologram image that exhibits visual depth cues, such as parallax and perspective. However, displaying media content via a hologram image (e.g., via a holographic medium that encodes a light field emanating from a scene as an interference pattern) may be challenging due to considerations relating to cost, space, equipment availabilities, viewing area environment, targeted audiences, and/or video (moving visual image) capabilities, for example.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a lensed display system includes a projector configured to project an image. The lensed display system includes a lens formed of a glass, crystalline, or polymer material. The lens includes a first surface, wherein at least a portion of the first surface includes a coating that is configured to display the projected image. The lens includes a second surface, wherein the second surface comprises a transparent curved surface that is configured to face toward a user and to enable the user to view the image projected onto the coating on the first surface through the transparent curved surface.

In another embodiment, a lensed display system includes a projector configured to project an image. The lensed display system includes a lens formed of a glass, crystalline, or polymer material. The lens includes a radially-inner curved surface, wherein the radially-inner curved surface is configured to face toward the projector and comprises a coating configured to display the projected image. The lens includes a radially-outer curved surface, wherein the radially-outer curved surface is configured to face away from the projector and to enable a user to view the image projected onto the coating on the radially-inner curved surface through the radially-outer curved surface.

In another embodiment, a lensed display system includes a projector configured to project an image. The lensed display system includes a lens formed of a glass, crystalline, or polymer material. The lens includes a first surface, wherein the first surface is configured to face toward the projector and at least a portion of the first surface comprises a coating configured to display the projected image. The lens includes a second surface, wherein the second surface is configured to face away from the projector and is configured to enable a user to view the image projected onto the coating through the second surface. The lensed display system also includes a cover configured to couple to the lens.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example, to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to lensed display systems and methods, and, more particularly, to lensed display systems capable of generating displays for amusement park attractions and experiences. The attractions may include any type of ride system that is designed to entertain a passenger, such as an attraction that includes a ride vehicle that travels along a path, an attraction that includes a room or theatre with stationary or moving seats for passengers to sit in while the passengers watch a video, or the like. In particular, the lensed display systems render a display that has similar visual effects (e.g., depth effect, parallax, 3D effect) as in hologram images, but without the challenges and/or costs associated with providing such hologram images. Additionally, while the disclosed embodiments generally discuss lensed display systems that are used for entertainment purposes, the disclosed embodiments may also apply to lensed display systems that are used for any other suitable purpose.

Figure 1:
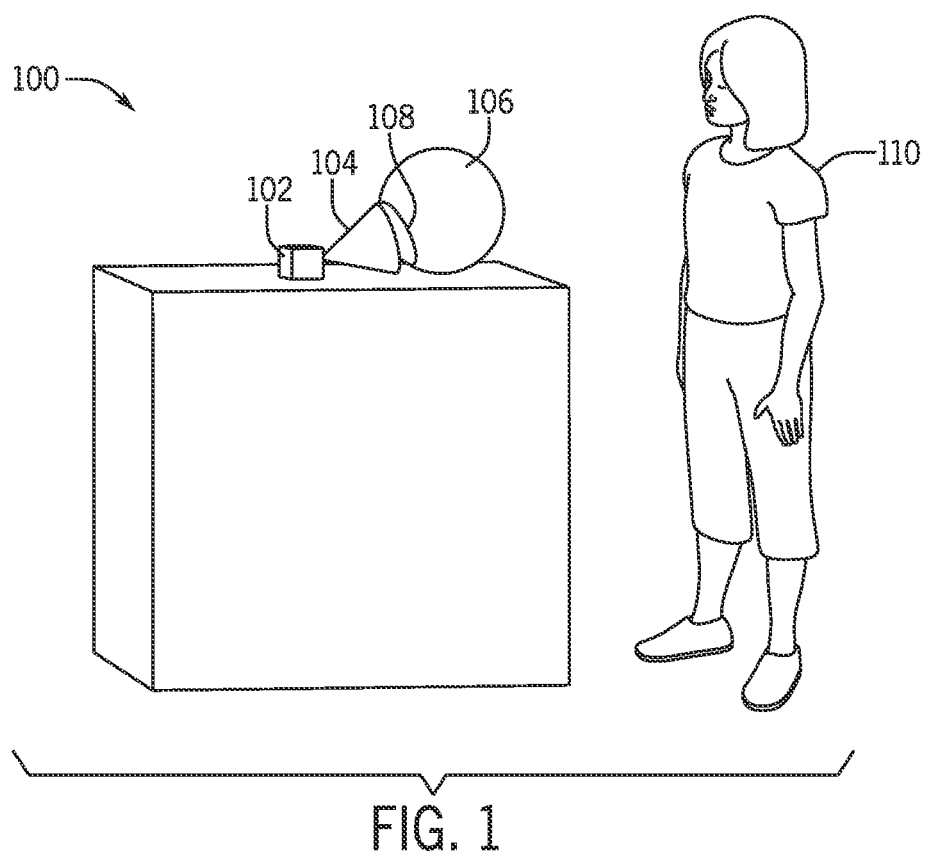
FIG. 1 illustrates a lensed display system including a projector and a lens, in accordance with an embodiment of the present disclosure.

With the foregoing in mind, FIG. 1 is a lensed display system 100 including a projector 102 and a lens 106, according to an embodiment of the present disclosure. The projector 102 may project an image 104 (e.g., still image, video image) onto a curved (i.e., spherical) outer surface (e.g., coated surface having a coating 108) of the lens 106. The projector 102 may be a still image projector, a video projector, or any other suitable type of projector. In certain embodiments, the projector 102 may be a rear projector (e.g., capable of reversing the image 104 projected) and/or may be positioned on an opposite side of the lens 106 from a user 110, as shown.

In the illustrated embodiment, the lens 106 is a spherical lens (e.g., having the curved outer surface positioned at a radius from a center). As shown, the spherical lens may be a solid sphere. In some embodiments, the lens 106 may have a diameter of at least 7 centimeters (cm) (e.g., 8 cm, 9 cm, 10 cm, 20 cm, 30 cm). The lens 106 may be formed from any suitable transparent material. The lens 106 may be formed of a glass material. Alternatively, the lens 106 may be formed of a crystalline material, polymer material, or any other suitable material having a refractive index within a range of 1 to 2. In certain embodiments, a refractive index of the lens 106 may be within a range, such as a range of approximately 1 to 2, 1.2 to 1.8, or 1.4 to 1.6. In some embodiments, a reflectance of the lens 106 may be equal to or less than approximately ten percent, five percent, or three percent. In certain embodiments, a transmission of the lens 106 may be equal to or greater than approximately eighty percent, ninety percent, or ninety-five percent.

The lens 106 may include the coating 108 on the curved outer surface of the lens 106. The coating 108 may be applied over at least a portion (e.g., approximately five percent, ten percent, twenty percent) of the curved outer surface of the lens 106. The coating 108 may be a projection paint painted onto the curved outer surface of the lens 106, a projection film adhered onto the curved outer surface of the lens 106, or any other type of coating that enables display of the image 104 projected by the projector 102. In certain embodiments, the coating 108 may be a rear projection coating that enables the image 104 to pass through the coating 108 and to be viewable by the user 110 (e.g., on the opposite side of the lens 106, as shown).

In this way, the user 110 may view the image 104 through the lens 106. As shown, a first portion of the curved outer surface having the coating 108 may face toward the projector 102 and a second portion of the curved outer surface may face away from the projector 102 (and toward the user 110, while the user 110 is present). The first portion of the curved outer surface may be disposed between the projector 102 and the second portion of the curved outer surface. For example, the user 110 may view the image 104 by looking through the second portion of the curved outer surface of the lens 106 that is opposite from the first portion of the curved outer surface. The lens 106 may distort the image 104 projected onto the coating 108. As a result, the image 104 may appear (e.g., to the user 110) to be displayed inside an interior of the lens 106. Additionally or alternatively, the lens 106 may warp the image 104 and generate a three-dimensional effect for the image 104. It should be appreciated that the lens 106 may have various other configurations. For example, the lens 106 may include any suitable curved outer surface and may be any suitable double convex lens or equiconvex lens (e.g., having a first radius of curvature at a first surface equal to a second radius of curvature at a second surface). In some embodiments, the user 110 may view the image 104 as part of an attraction, such as while the user 110 is within a ride vehicle.

Figure 2:
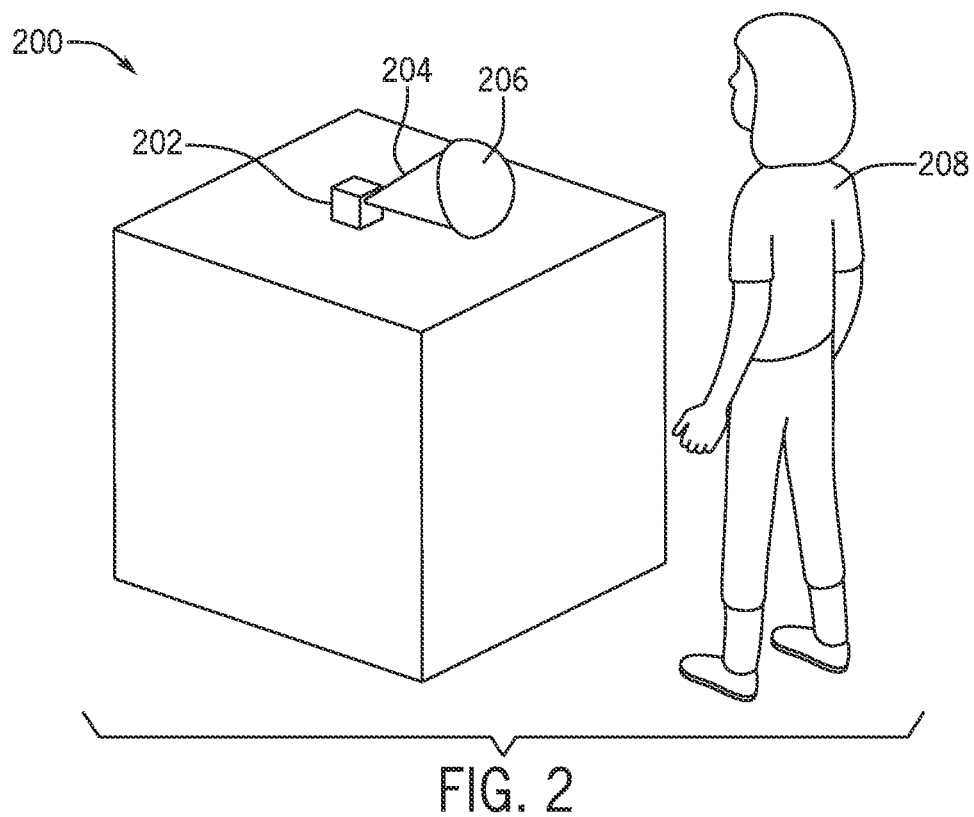
FIG. 2 illustrates a lensed display system including a projector and a hemispherical lens, in accordance with an embodiment of the present disclosure.

FIG. 2 is a lensed display system 200 including a projector 202 and a lens 206. The projector 202 may project an image 204 (e.g., still image, video image) onto a surface (e.g., coated surface) of the lens 206. The projector 202 may be a still image projector, a video projector, or any other suitable type of projector. In certain embodiments, the projector 202 may be a rear projector (e.g., capable of reversing the image 204 projected) and/or may be positioned on an opposite side of the lens 206 from a user 208, as shown.

In the illustrated embodiment, the lens 206 is a hemispherical lens (e.g., having a curved (e.g., spherical) outer surface positioned at a radius from a center; half of a sphere; spherical segment). As shown, the lens 206 may be a solid hemisphere or spherical segment. Thus, the lens 206 may be a plano-convex lens. For example, the lens 206 may include a first, planar surface facing toward the projector 202 and a second, convex surface (e.g., the curved outer surface) facing away from the projector 202 (and toward the user 208, while the user 208 is present). In certain embodiments, the first, planar surface may be disposed between the projector 202 and the second, convex surface. Alternatively, the lens 206 may contain a hollow cavity (e.g., recess) within an interior of the lens 206. Thus, instead of the first, planar surface facing toward the projector 202, the lens 206 may include a first, curved inner surface (e.g., concave surface) facing toward the projector 202.

In some embodiments, the lens 206 may have a diameter of at least 7 cm, 8 cm, 9 cm, 10 cm, 20 cm, or 30 cm. The lens 206 may be formed from any suitable transparent material. The lens 206 may be formed of a glass material. Alternatively, the lens 206 may be formed of a crystalline material, polymer material, or any other suitable material having a refractive index between 1 to 2. In certain embodiments, a refractive index of the lens 206 may be within a range, such as a range of approximately 1 to 2, 1.2 to 1.8, or 1.4 to 1.6. In some embodiments, a reflectance of the lens 206 may be equal to or less than approximately ten percent, five percent, or three percent. In certain embodiments, a transmission of the lens 206 may be equal to or greater than approximately eighty percent, ninety percent, or ninety-five percent.

The lens 206 may include the coating on the first, planar surface of the lens 206. For example, the coating may be applied to at least a portion of the first, planar surface of the lens 206. The coating may be a projection paint painted onto the first, planar surface of the lens 106, a projection film adhered onto the first, planar surface of the lens 106, or any other type of coating that enables display of the image 204 projected by the projector 202. In certain embodiments, the coating may be a rear projection coating that enables the image 204 to pass through the coating and be viewable by the user 208 (e.g., on the opposite side of the lens 206). As noted above, instead of the first, planar surface facing toward the projector 202, the lens 206 may include a first, curved inner surface (e.g., concave surface) facing toward the projector 202. In such cases, the lens 206 may include the coating on the first, curved inner surface.

In this way, the user 208 may view the image 204 through the lens 206. In some embodiments, the first surface (e.g., the first, planar surface; the first, curved inner surface) of the lens 206 having the coating may face toward the projector 202 and the second surface (e.g., the second, convex surface; the curved outer surface) may face away from the projector 202 (and toward the user 208, while the user 208 is present). The first surface may be disposed between the projector 202 and the second surface. For example, the user 208 may view the image 204 that is projected onto the first surface by looking through the second surface of the lens 206 that is opposite from the first surface. The lens 206 may distort the image 204 projected onto the coating. As a result, the image 204 may appear (e.g., to the user 208) to be displayed inside an interior of the lens 206. Additionally or alternatively, the lens 206 may warp the image 204 and generate a three-dimensional effect for the image 204. In some embodiments, the user 208 may view the image 204 as part of an attraction, such as while the user 208 is within a ride vehicle.

Figure 3:
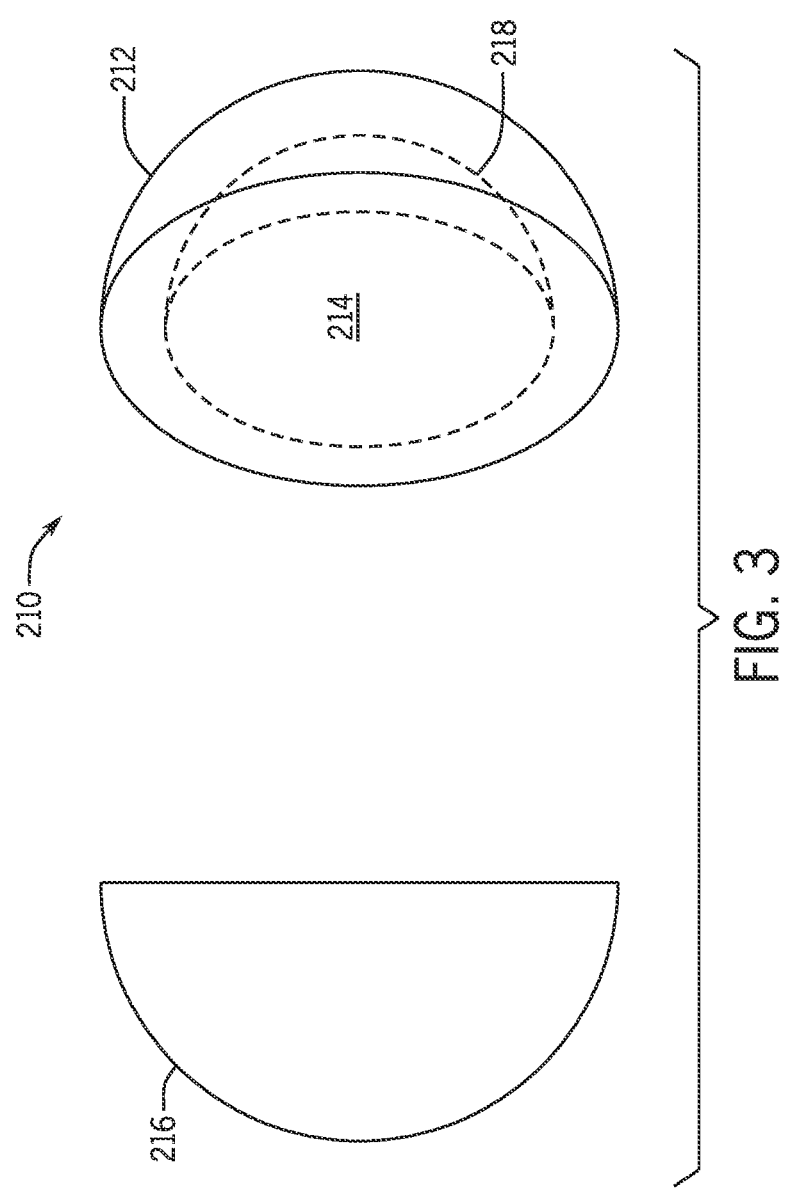
FIG. 3 illustrates a lensed display system including a lens and a cover, in accordance with an embodiment of the present disclosure.

With the foregoing in mind, FIG. 3 illustrates a lensed display system 210 including a lens 212 and a cover 216. The lens 212 of FIG. 3 may be similar to the lens 206 in FIG. 2. Indeed, the lens 212 of FIG. 3 may include any of the features of the lens 206 of FIG. 2 (e.g., a hollow cavity formed by a first, curved [e.g., spherical] inner surface), and the lens 206 of FIG. 2 may include any of the features of the lens 212 of FIG. 3 (e.g., a first, planar surface having a coating 214). Furthermore, the lens 212 of FIG. 3 (with or without the cover 216 of FIG. 3) may be used in the lensed display system 200 of FIG. 2 in place of the lens 206 of FIG. 2.

As shown, the lens 212 is a hemispherical lens. The lens 212 may be a solid hemisphere or spherical segment. Thus, the lens 212 may be a plano-convex lens. In such cases, the lens 212 may include a first, planar surface and a second, curved (e.g., spherical) surface (e.g., a curved outer surface). The lens 212 may include the coating 214 on the first, planar surface. The coating 214 may be a projection paint painted onto the first, planar surface of the lens 212, a projection film adhered onto the first, planar surface of the lens 212, or any other type of coating that enables display of an image projected by a projector, such as the projector 202 in FIG. 2. In certain embodiments, the coating 214 may be a rear projection coating that enables an image to pass through the coating 214 and be viewable by a user (e.g., on an opposite side of the lens 212). As noted above, the lens 212 may include a hollow cavity 218, which is shown in dotted lines to facilitate discussion. For example, a portion of the first, planar surface of the lens 212 may be milled to form a curved (e.g., spherical) inner surface (e.g., concave surface). In such cases, the coating 214 may be applied on at least a portion of the curved inner surface.

In some embodiments, the lensed display system 210 may include the cover 216. As shown, the cover 216 may have a hemispherical shape or may be a spherical segment. In certain embodiments, the cover 216 may be a hemispherical shell including an interior cavity (e.g., hollow cavity or recess). In some embodiments, the cover 216 may be formed of a glass material, a crystalline material, or a thermoplastic material. For example, the cover 216 may be formed of an acrylic material. In certain embodiments, a reflectance of the cover 216 may be equal to or less than approximately ten percent, five percent, or three percent. In some embodiments, a transmission of the cover 216 may be equal to or greater than approximately eighty percent, ninety percent, or ninety-five percent). In certain embodiments, a refractive index of the cover 216 may be within a range, such as a range of approximately 1 to 2, 1.2 to 1.8, or 1.4 to 1.6. The cover 216 may be coupled to the lens 212 (e.g., via an adhesive). In some embodiments, when joined together, the lens 212 and the cover 216 may form a spherical shape (e.g., form a complete sphere; have substantially equal radii). The cover 216 may enable an image projected by a projector, such as the projector 202 in FIG. 2, positioned on one side of the lensed display system 210 to pass through the cover 216 and to be displayed on the coating 214 for visualization by a user (e.g., on another side of the lensed display system 210, on the opposite side of the lens 212 from the projector; looking through the second, curved surface of the lens 212) without any appreciable distortion of the image. As a result, the image may appear (e.g., to the user) to be displayed inside an interior of the lens 212.

The cover 216 may be formed by molding, milling, or any other suitable formation process. For example, the cover 216 may be formed of a resin poured into a mold. Additionally or alternatively, at least a portion of the cover 216 may be milled to remove additional material from the cover 216. For example, the cover 216 may be formed into the hemispherical shell by milling the interior cavity into the cover 216.

Figure 4:
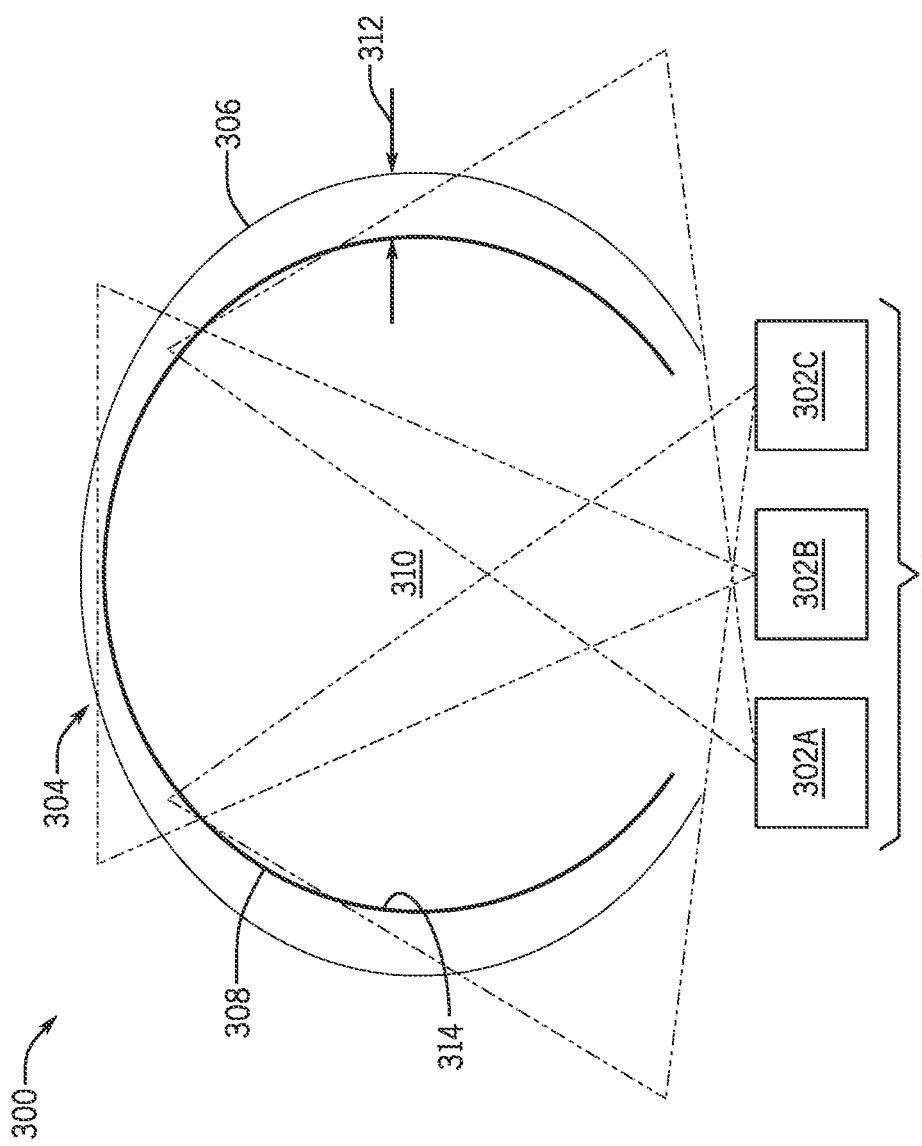
FIG. 4 illustrates a lensed display system including a lens having a cavity disposed therein, in accordance with an embodiment of the present disclosure.

FIG. 4 illustrates a lensed display system 300 including a lens 304 and a set of projectors 302A, 302B, 302C (collectively referred to as projectors 302). The projectors 302 may be still image projectors, video projectors, or any other suitable type of projectors. In certain embodiments, the projectors 302 may be rear projectors (e.g., capable of reversing the image projected) and/or may be positioned on an opposite side of the lens 304 from a user. As shown, each of the projectors 302 may project light in a respective, different direction (e.g., a first projector may project light centered about a first axis and a second projector may project light centered about a second axis that is different from the first axis). Such embodiments may enable a user to view images (e.g., a first image via the first projector and a second image via the second projector, and the first image and the second image may be the same or different from one another) while the user stands at different positions relative to the lens 304 and/or may enable multiple users to view the images while the users stand at different positions relative to the lens 304.

In the illustrated embodiment, the lens 304 is a spherical shell. For example, the lens 304 includes a curved (e.g., spherical) outer surface 306 (e.g., radially-outer surface) that is at least a portion of a sphere, such as at least one half (e.g., two-thirds, three-quarters, four-fifths) of a sphere. The lens 304 may include a hollow cavity 310 disposed within an interior of the lens 304. The hollow cavity 310 of the lens 304 may be formed by milling at least a portion of the lens 304. In certain embodiments, the lens 304 may include an opening through which the projectors 302 project an image.

The lens 304 may include the curved outer surface 306 and a curved (e.g., spherical) inner surface 308 (e.g., radially-inner surface). In certain embodiments, the curved outer surface 306 may face away from the projectors 302 (e.g., and toward the user, while the user is present) and the curved inner surface 308 may face toward the projectors 302. The curved inner surface 308 may be disposed between the projectors 302 and the curved outer surface 306. For example, the user may view the image by looking through the curved outer surface 306. The lens 304 may have a diameter of at least 7 cm, 8 cm, 9 cm, 10 cm, 20 cm, or 30 cm. The lens 304 may have a thickness 312 (e.g., radial thickness) measured between the curved outer surface 306 and the curved inner surface 308. The thickness 312 may be equal to or greater than approximately 2 cm (e.g., 3 cm, 4 cm, 5 cm). In certain embodiments, the thickness 312 of the lens 304 may be uniform. Alternatively, the thickness 312 may vary throughout the lens 304 (e.g., a smallest thickness may be located at a portion directly opposite the projectors 302).

The curved inner surface 308 may include a coating 314. For example, the coating 314 may be applied to at least a portion of the curved inner surface 308. The coating 314 may be a projection paint painted onto the curved outer surface of the lens 306, a projection film adhered onto the curved outer surface of the lens 306, or any other type of coating that enables display of an image projected by the projectors 302. In certain embodiments, the coating 314 may be a rear projection coating that enables an image to pass through the coating 314 and to be viewable by a user (e.g., on an opposite side of the coating 314 and the lens 304 from the projectors 302).

In this way, a user may view an image through the lens 304. In particular, the lens 304 may distort the image projected onto the coating 314. As a result, the image may appear (e.g., to the user) to be displayed inside an interior of the lens 304. Additionally or alternatively, the lens 304 may warp the image and generate a three-dimensional effect for the image. In some embodiments, the user may view the image as part of an attraction, such as while the user is within a ride vehicle.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A lensed display system, comprising:
a lens comprising:
a first surface comprising a planar surface, wherein at least a portion of the first surface comprises a coating configured to enable display of an image on the coating; and
a second surface comprising a curved surface configured to face toward a user and to enable the user to view, through the curved surface, the image on the coating;
wherein the lens is configured to distort the image such that the image appears to the user to be inside an interior of the lens, appears to the user to be a three-dimensional image, or both.

2. The lensed display system of claim 1, wherein the coating comprises a rear projection coating.

3. The lensed display system of claim 1, wherein the coating comprises a paint or a film.

4. The lensed display system of claim 1, wherein the lens comprises a plano-convex shape.

5. The lensed display system of claim 1, comprising a cover, wherein the cover and the lens form a spherical shape when coupled to one another.

6. The lensed display system of claim 1, comprising a projector configured to project the image onto the coating.

7. The lensed display system of claim 1, wherein the curved surface is formed of a glass material, a crystalline material, or a thermoplastic material.

8. A lensed display system, comprising:
a lens comprising:
a first curved surface comprising a coating configured to enable display of an image on the coating; and
a second curved surface configured to enable a user to view, through the second curved surface, the image displayed on the coating;
wherein the lens is configured to distort the image such that the image appears to the user to be inside an interior of the lens, appears to the user to be a three-dimensional image, or both.

9. The lensed display system of claim 8, wherein the lens is a spherical lens, the first curved surface is a first portion of the spherical lens, and the second curved surface is a second portion of the spherical lens.

10. The lensed display system of claim 8, wherein the first curved surface is disposed between the second curved surface and a projector that projects the image onto the coating.

11. The lensed display system of claim 8, wherein the lens comprises a hemispherical lens, and the first curved surface forms a radially-inner curved surface of the hemispherical lens, and the second curved surface forms a radially-outer curved surface of the hemispherical lens.

12. The lensed display system of claim 8, wherein a refractive index of the lens is between 1 and 2.

13. The lensed display system of claim 8, wherein the lens is formed of a glass material, a crystalline material, or a thermoplastic material.

14. A lensed display system, comprising:
a lens comprising:
a first surface, wherein the first surface is configured to face toward a projector and at least a portion of the first surface is configured to display an image projected onto the first surface by the projector; and
a second surface, wherein the second surface is configured to face away from the projector and is configured enable a user to view, through the second surface, the image projected onto the first surface;
wherein the lens is configured to distort the image such that the image appears to the user to be inside an interior of the lens, appears to the user to be a three-dimensional image, or both.

15. The lensed display system of claim 14, wherein the first surface comprises a curved radially-inner surface and the second surface comprises a curved radially-outer surface.

16. The lensed display system of claim 15, wherein the lens comprises a spherical lens with an opening, and the image is projected through the opening and onto the first surface by the projector.

17. The lensed display system of claim 15, comprising:
the projector configured to project the image onto the first surface; and
one or more additional projectors, wherein each additional projector of the one or more additional projectors is configured to project a corresponding additional image onto the first surface, wherein at least the portion of the first surface is configured to display the image and each corresponding additional image, and the second surface is configured to enable the user to view, through the second surface, the image and each corresponding additional image projected onto the first surface.

18. The lensed display system of claim 17, wherein the projector is positioned to project first respective light in a first direction to project the image onto the first surface, and each additional projector of the one or more additional projectors is configured to project corresponding respective light in a corresponding direction to project the corresponding additional image onto the first surface.

19. The lensed display system of claim 18, wherein the lens is configured to enable the user to view, through the second surface, the image while the user is at a first position relative to the lens and a corresponding additional image of the one or more corresponding additional images while the user is at a second position relative to the lens.

20. The lensed display system of claim 14, comprising a cover configured to be positioned between the projector and the lens, wherein the cover is formed of a glass material, a crystalline material, a thermoplastic material, or an acrylic material.

* * * * *